United States Patent
Eck et al.

(10) Patent No.: US 6,912,456 B2
(45) Date of Patent: Jun. 28, 2005

(54) SHIFTING PROCESS CONTROL AND METHOD FOR COORDINATING SHIFTING PROCESSES

(75) Inventors: Martin Eck, Hemmingen (DE); Ernst Tobias, Waiblingen (DE); Uwe Maienberg, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 89 days.

(21) Appl. No.: 10/221,852

(22) PCT Filed: Dec. 22, 2001

(86) PCT No.: PCT/DE01/04910

§ 371 (c)(1),
(2), (4) Date: Oct. 4, 2002

(87) PCT Pub. No.: WO02/057660

PCT Pub. Date: Jul. 25, 2002

(65) Prior Publication Data

US 2003/0115942 A1 Jun. 26, 2003

(30) Foreign Application Priority Data

Jan. 17, 2001 (DE) .......................................... 101 01 829

(51) Int. Cl.⁷ ................................................. G06F 7/00
(52) U.S. Cl. .............................. 701/54; 701/51; 701/55
(58) Field of Search .............................. 701/54, 52, 55, 701/51, 61, 62, 64; 477/34

(56) References Cited

U.S. PATENT DOCUMENTS 5,948,033 A   9/1999   Baer et al.

FOREIGN PATENT DOCUMENTS

| DE | 195 24 412 | 9/1996 |
| DE | 199 37 455 | 4/2000 |
| DE | 199 16 006 | 10/2000 |
| EP | 1 065 413  | 1/2001 |

Primary Examiner—Yonel Beaulieu
(74) Attorney, Agent, or Firm—Walter Ottesen

(57) ABSTRACT

The present invention relates to a shift sequence control to coordinate shifting, which corresponds to changes of constellations in a transmission. A change of the constellations yields a change of the force transfer of the transmission. The sequence of shifting takes place program-controlled and is subdivided into phases (0, 1, 2, 3, 4, 5, 6, 7). The sequence includes the driving of a plurality of actuating elements and each of the phases is assigned at least one type of drive for at least one actuating element.

According to the invention, it is provided that the phases (0, 1, 2, 3, 4, 5, 6, 7) can be configured without changing the program.

Furthermore, the present invention relates to a method for coordinating shifting sequences.

27 Claims, 6 Drawing Sheets

SHIFTING PROCESS CONTROL AND METHOD FOR COORDINATING SHIFTING PROCESSES

This application is the national stage of International Application No. PCT/DE01/04910, filed Dec. 22, 2001, designating the United States.

FIELD OF THE INVENTION

The present invention relates to a shift sequence control for coordinating shifting, which corresponds to changes of constellations in a transmission. A change of the constellation results in a change of the force transfer of the transmission and the sequence of the shifting takes place via program control and is subdivided into phases which are assigned at least one type of drive for at least one actuator element. The sequence includes the control of a plurality of actuators. Furthermore, the present invention relates to a method for coordinating shift sequences which correspond to changes of constellations in a transmission. A change of the constellation results in a change of the force transfer of the transmission. In the method, the sequence of shifting takes place via a program control and is subdivided into phases in which at least a type of drive is assigned for at least one actuator. The sequence includes the driving of a plurality of actuators.

BACKGROUND OF THE INVENTION

DE 19937455 A1 discloses a related arrangement and a related method for coordinating the control of the drive train of a motor vehicle during transmission shifting operations. This publication concerns the coordinated control of the elements "servoclutch", "vehicle engine" and "transmission" during a change of the transmission ratio. These elements are arranged in the drive train of a motor vehicle. Each of these elements of the drive train is assigned a driver stage, which is connected to the coordination means. According to the above-mentioned publication, the coordination means selectively issues either desired values for adjusting an engine output torque or a clutch input torque or desired values for adjusting an engine output rpm or a transmission input rpm during the change of the transmission ratio of the engine driver stage. Furthermore, desired values for adjusting a transmission ratio are transferred to the transmission driver stage by the coordination means. DE 19937455 A1 relates therefore to a shift sequence control for an automated shift transmission. Three phases (torque reduction, gear change, torque build-up) are provided, which are adapted precisely to the automated shift transmission. A disadvantage of the known shift sequence control or the known method is that this shift sequence control or this method cannot be or can be adapted only with great complexity to other transmission types such as a stepped automatic or a continuously variable transmission (CVT).

SUMMARY OF THE INVENTION

According to the present invention, it is provided that the phases can be configured without a change of the program. For this reason, the shift sequence control according to the invention can be used for different transmission types as well as within a transmission type for different configurations. The change of the program takes place especially in the context of present functions.

In the shift sequence control according to the invention, it is preferably provided that at least some of the phases are assigned criteria whose satisfaction leads to an end of the corresponding phase. These criteria can also be characterized as trigger functions and can be made available to a specific project and with corresponding parameter functions. The criteria or trigger functions are provided with data via the parameter functions. In this way, a user has, for example, the possibility to select one or several trigger functions and the corresponding parameter functions in a data table via an index for the definition of a phase. In this way, the entire shift sequence can be freely configured via the phase definition without program changes being necessary.

The criteria include preferably time criteria. Such time criteria can, for example, lead to the end of a phase when a pregiven time span is exceeded. The start of a pregiven time span can, for example, be placed at the SS point, the SB point, the SF point or the SE point. The SS point is the start point of the actual shift operation which can be defined as that point at which a decision was made to start the actual shift type. The SB point is the time point at which the shifting is begun. This time point can be defined as a time point at which the change of the transmission ratio begins (leaving the synchronous rpm). The SF point identifies a time point at which the next state of the transmission ratio is reached, that is, the synchronous time point. Finally, the SE point identifies the shifting end at which the dynamic states of the transmission are completed and the next static state of the transmission can be selected.

The time criteria can consider one or several of the following measured or estimated times: time to reach or leave a synchronous rpm; time to start or end of a shift phase; time until a pregiven pressure is reached or left. Furthermore, it is conceivable that only the time is monitored which has elapsed since the start of a specific phase.

In addition to the time criteria, the criteria preferably further include event criteria. An event criterion of this kind is, as a rule, satisfied when a correspondingly monitored physical variable has reached a pregiven value. Here, not all the monitoring of the transmission itself but also the monitoring variables are considered, which concern any number of additional vehicle components.

The event criteria can, for example, consider one or several of the following variables and/or their time-dependent derivations: engine rpm, transmission ratio, synchronous rpm, thrust forces, acceleration torques, accelerator pedal position, turbine rpm, output rpm, et cetera. In this context, it can likewise be advantageous to combine time criteria and event criteria in a suitable manner.

The actuator elements, which are controlled during the phases, can, for example, include: pressure controller valves and/or magnetic valves and/or step motors and/or internal combustion engine control means. For some actuator elements, it can be provided that they provide feedback which can correspond to the fulfillment of a criterion so that a feedback of this kind can cause, for example, a change of a phase. For example, in some stepped automatics having brake pads, a switch is provided which detects the black-white position "brake band applied" or "brake band not applied" and supplies a corresponding feedback.

In the shift sequence control of the invention, it is preferably provided that at least some of the phases and/or some of the criteria are at least assigned a sequence phase, which is run through at the end of the phase or when a criterion is satisfied. In this way, and depending upon the operating state, a branching to an appropriate phase can be made.

In the shift sequence control of the invention, the configuration of the phases takes place preferably by data which define the type of drive and/or the criteria and/or the sequence phases. In this context, it is preferably further provided that the data at least are adaptable to different transmission types and transmission manufacturing series.

The data can, for example, be in the form of tables, which make possible a change of the phase control without program change.

In the shift sequence control of the invention, it can further be provided that state quantities are detected and that, based on these state quantities, a shift strategy is selected to which predetermined phases are assigned. In this context, it is, for example, possible to detect the driving style of a driver and to assign a shift strategy adapted to this driving style.

The state quantities can, for example, be the current gear and/or the target gear (which can, for example, be determined via the driver command) and/or the vehicle speed and/or the engine torque.

To adapt the shift sequence control of the invention in a simple manner to different transmission types and transmission manufacture series, it is preferably provided that the shift strategies can be configured without changing the program in the context of the functions which are available.

For this purpose, the data preferably also define assignments of phases to shift strategies. In this context too, it is possible to provide the data in the form of tables.

At least one of the actuator elements can be an active actuator element which can request the end of a phase. "Request", in this context, is understood to mean that a corresponding signal of an actuator must not lead inexorably to the end of a phase but that this end of the phase is dependent upon other criteria.

With the method of the invention for coordinating shift sequences, it is provided that the phases are defined by data which are changeable without changing the program. In this way, a method is made available which is adaptable in a simple manner to different transmission types and transmission manufacture series.

With the method of the invention, it is preferably provided that, via the data, at least to some of the phases "criteria" are assigned whose satisfaction leads to an end of the corresponding phase. In the method of the invention too, the criteria or trigger functions can be made available to a specific project and with corresponding parameter functions. Attention is directed to the corresponding description in combination with the shift sequence control according to the invention.

Also in this context, the criteria include preferably time criteria. The start of the time spans, which are fixed by the time criteria, can be coincident here also with the SS point, the SB point, the SF point or the SE point, which have already been explained.

As in the shift sequence control according to the invention, the time criteria can also consider in the method of the invention one or several of the following measured or estimated times: time up to reaching or leaving a synchronous rpm, time up to the start or the end of a shift phase, time up to reaching or leaving a pregiven pressure. In this context, reference is made to the above explanations in connection with the shift sequence control.

In the method of the invention, the criteria preferably include event criteria.

Likewise, as in the shift sequence control of the invention, these can be formed, for example, via one or several of the following quantities and/or their time-dependent derivations: engine rpm, transmission ratio, synchronous rpm, thrust forces, acceleration torques, accelerator pedal position, turbine rpm, output rpm.

The data provided by the invention include preferably drive data for actuating elements which can be formed by pressure controller valves and/or magnetic valves and/or step motors and/or internal combustion engine control means. It can be advantageous also in connection with the method of the invention to provide the data in the form of corresponding tables.

At least to some of the phases or some of the criteria preferably at least one sequence phase is assigned via the data, which sequence phase is run through at the end of the phase or with the satisfaction of a criterion. In this way, the method of the invention can branch to respective appropriate phases.

In order to obtain a useability of the method of the invention as universal as possible, the data are adaptable, preferably in a simple manner, to different transmission types and transmission manufacture series. The correspondingly adapted data are preferably made available via suitable memory media.

Likewise, as in the shift sequence control of the invention, state quantities can be detected also in the method of the invention and a suitable shift strategy can be selected based on these state quantities to which predetermined phases are assigned. Here too, the state quantities can include the current gear and/or the target gear and/or the vehicle speed and/or the engine torque. The shift strategies are preferably configurable via the data without changes of the program and the data define the assignment of phases to shift strategies. To avoid repetitions, reference can be made to the corresponding explanations in connection with the shift sequence control of the invention.

BRIEF DESCRIPTION OF THE DRAWING

The invention will now be explained with reference to the drawings wherein.

DESCRIPTION OF THE PREFERRED EMBODIMENTS OF THE INVENTION

Figure 1:
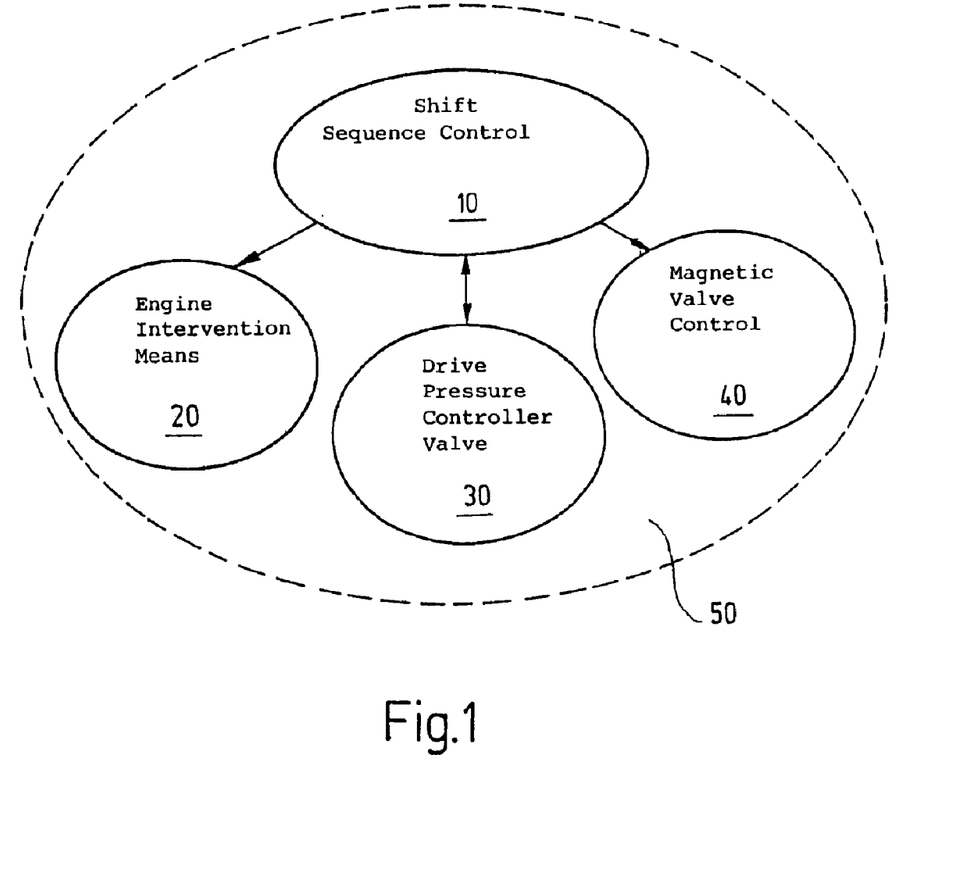
FIG. 1 shows the interaction of an embodiment of the shift sequence control of the invention with engine intervention means, a drive for the pressure control valves, and a magnetic valve control.

FIG. 1 shows the interaction of an embodiment of the shift sequence control of the invention with engine intervention means, a drive for the pressure controller valves and a magnetic valve drive.

In the following, the following reference numerals are used:
10 shift sequence control;
20 engine intervention means;
30 drive pressure controller valve;
40 magnetic valve control; and,
50 transmission.

In this embodiment, the components of an actuator element lie on the same structural plane. As indicated in FIG. 1 by the double arrow, so-called active actuator elements are provided in the form of the drive of the pressure controller valves. These active actuator elements intervene actively in the shift sequence control. The actuator elements request, depending upon their state, the further shifting of the phase. According to the illustration, the shift sequence control is integrated into the component "transmission" because of their close interaction. The same applies to the engine intervention means, which are, for example, responsible for a torque request and the magnetic valve control. For example, in a stepped automatic, the torque intervention is closely connected to the pressure control and serves to support the pressure controller valves. The structure shown in FIG. 1 likewise makes possible an independent torque intervention as it can be required, for example, in an automated shift transmission.

Figure 2:
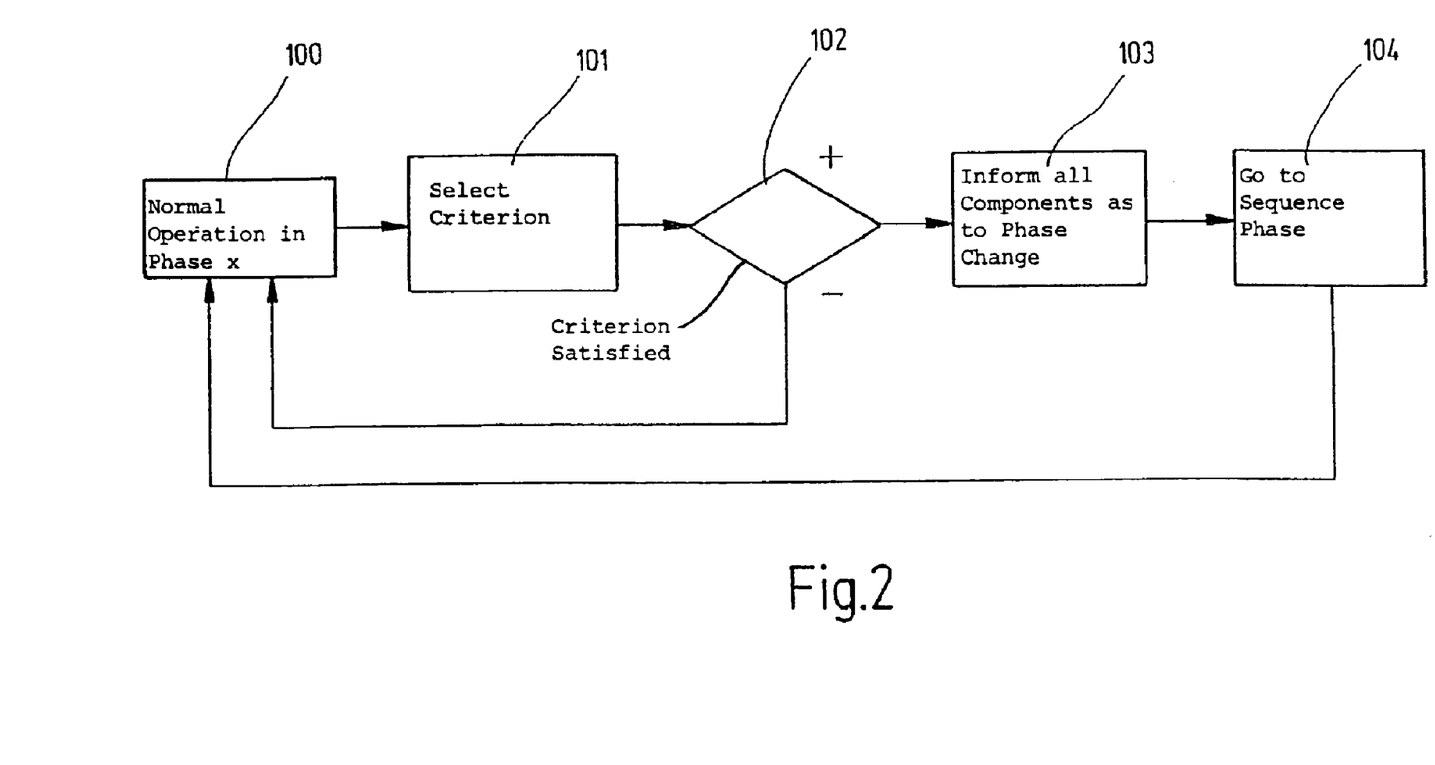
FIG. 2 shows a flowchart which illustrates the change of a phase in dependence upon the satisfaction of a criterion.

FIG. 2 shows a flowchart which explains the change of a phase in dependence upon the satisfaction of a criterion.

The blocks are assigned the following content:
block 100: normal operation in phase x;
block 101: select criterion;
block 102: criterion satisfied;
block 103: inform all components as to phase change;
block 104: go to sequence phase.

In block 100, the normal operation takes place in a phase x which, for example, can be formed by one of the phases 0, 1, 2, 3, 4, 5, 6 or 7, which will be explained hereinafter (it is understood that, in practice, also another number of phases can be used). Starting from this block 100, one reaches block 101, wherein a criterion is selected. This criterion can, for example, be formed by a suitable time criterion and/or a suitable event criterion. In block 102, a check is made as to whether the criterion, which was selected in block 101, is satisfied or is not satisfied. If it is determined in block 102 that the criterion is satisfied, then all participating components are informed via block 103 that a phase change is to come. Thereafter, in block 104, the change to a suitable sequence phase is triggered, which then forms the normal operation in block 100. If it is determined in block 102 that the criterion is not satisfied, then there is a direct return to block 100 without a change to a sequence phase being triggered.

Figure 3:
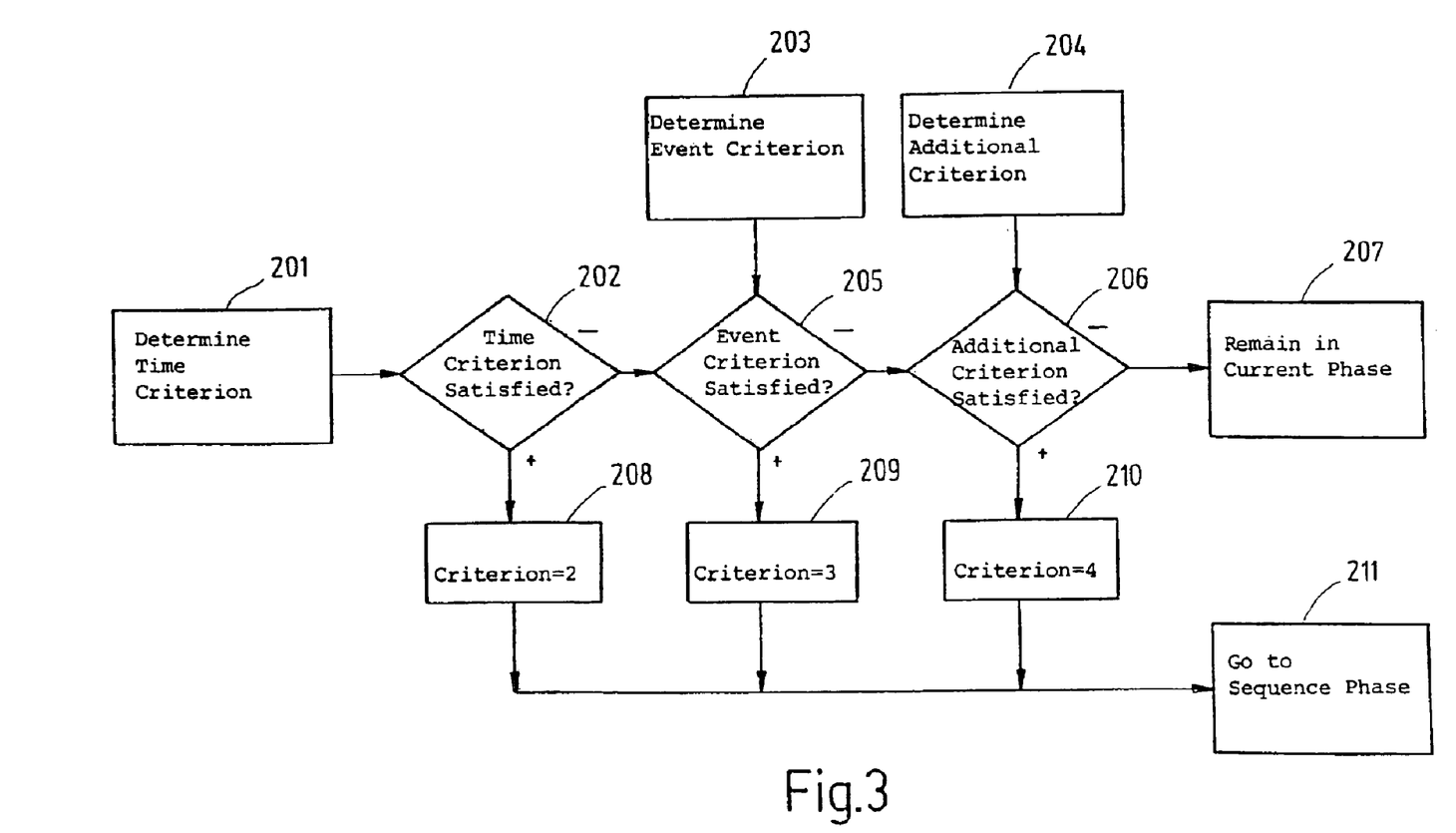
FIG. 3 shows a flowchart which explains the change of a phase in dependence upon time criteria and event criteria.

FIG. 3 shows a flowchart which explains the change of a phase in dependence upon time criteria and event criteria.

The blocks have the following content:
block 201: determine time criterion;
block 202: time criterion satisfied?;
block 203: determine event criterion;
block 204: determine additional criterion;
block 205: event criterion satisfied?;
block 206: additional criterion satisfied?;
block 207: remain in current phase;
block 208: criterion=2;
block 209: criterion=3;
block 210: criterion=4;
block 211: go to sequence phase.

In block 201, a time criterion is determined. This time criterion can, for example, fix: the time to reach or leave a synchronous rpm; the time up to the start or end of an overrun phase; the time to reach or leave a pregiven pressure; or, the time provided for a specific phase. In block 202, a check is made as to whether the time criterion, which is determined in block 201, is satisfied or not. If the time criterion is not satisfied, then there is a branching to block 205, wherein an event criterion is checked which was determined in block 203. The event criterion, which was determined in block 203, can, for example, concern the engine rpm; the transmission ratio; synchronous rpm; thrust forces; acceleration torques; or the accelerator pedal position. If it is determined in block 205 that the event criterion, which was determined in block 203, is not satisfied, then there is a branching to block 206 wherein a check is made as to whether an additional criterion, determined in block 204, is satisfied, which can be required in some transmission types. The additional criteria are understood, for example, to be transmission-specific sensors. Such a sensor can, for example, supply the feedback signal of a brake band. If it is determined in block 206 that the additional criterion is also not satisfied, there is a branching to block 207, which determines that the current phase is maintained. If it is determined in block 202 that the time criterion is satisfied, then a variable CRITERION is set to 2 in block 208 and then there is a branching to block 211, which states that there has to be a change to a sequence phase. If it is determined in block 205 that the event criterion is satisfied, then the variable CRITERION is set in block 209 to 3 and there is then a branching to block 211. Correspondingly, the variable CRITERION in block 210 is set to 4 and there is a branching to block 211 if it is determined in block 206 that the additional criterion is satisfied.

In FIGS. 4 to 9, the following abbreviations or designations are used:

SS start point of the current shift operation which is defined as the point at which a decision is made to start the current shift type;

SB time point at which the shifting is started. This time point is defined as a time point at which the change of the transmission ratio is started (leaving the synchronous rpm);

SF time point at which the next state of the transmission ratio is reached, that is, the synchronous time point;

SE the time point of the end of shifting at which the dynamic states of the transmission are completed and the next static state of the transmission can be selected.

Figure 4:
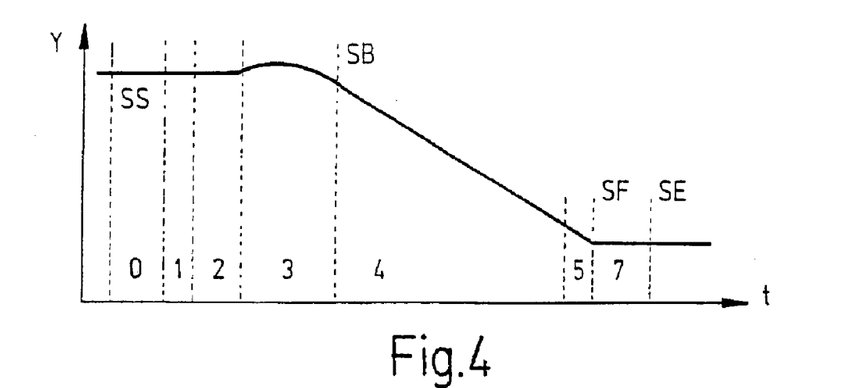
FIG. 4 shows an example for a definition of phases for the operation of an upshift.

FIG. 4 is an example of a possible phase definition for the operation of upshifting. A short description of the corresponding phases as well as the particular normal end criterion is evident from the following Table I. The term "blowup" identifies an unwanted state in the transmission wherein the pressure conditions are not optimal. This state is also characterized as a tearing-up of the transmission. Furthermore, the turbine rpm identifies the rpm at the transmission input (if appropriate, after a converter).

TABLE I

| Phase | Description | Normal End Criterion |
|---|---|---|
| 0 | Charging phase in which clutches are filled or released | as a rule, time criteria |

TABLE I-continued

| Phase | Description | Normal End Criterion |
|---|---|---|
| 1 | Relaxation phase | Time criteria or event criteria of the pressure control |
| 2 | Await first reaction | Blowup |
| 3 | Wait for shift start | Leaving synchronous rpm |
| 4 | Shift operations running | Specific spacing from the synchronous rpm is attained (either estimated time criterion or turbine rpm criterion) |
| 5 | Preparation phase before reaching the synchronous rpm | Synchronous rpm is attained |
| 6 | Here not used | |
| 7 | Control after reaching the synchronous rpm | Shift operation is completed |

Figure 5:
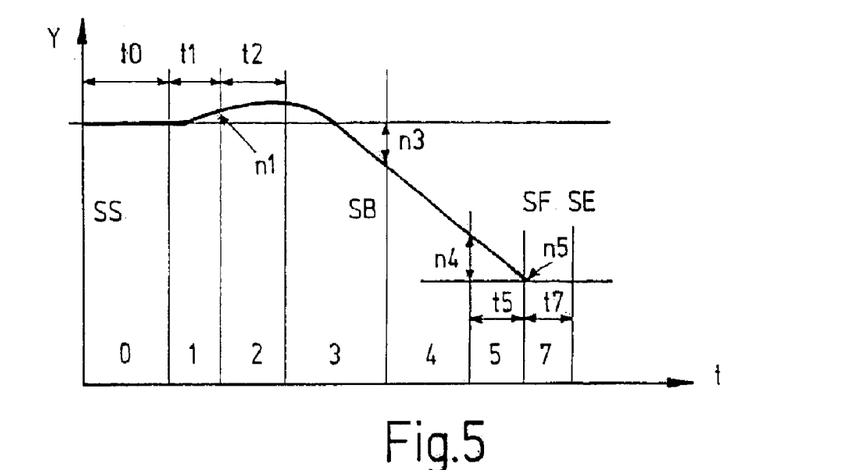
FIG. 5 shows an example of an rpm trace for a pull upshift operation wherein an upshift is from the second gear to the third gear with a phase definition according to FIG. 4.

FIG. 5 shows an example of the rpm trace for a pull upshift operation (wherein there is an upshift from the second gear into the third gear) for a phase definition according to FIG. 4 or Table I. In FIG. 5, the absolute rpm(s) are characterized by $n_1$; whereas, the time intervals are identified by $t_1$. The following values apply for the rpm trace shown in FIG. 5: $t_0$=80 ms, $t_1$=120 ms, $t_2$=150 ms, $t_5$=100 ms, $t_7$=100 ms, $n_1$=20 1/min, $n_3$=20 1/min, $n_4$=100 1/min, $n_5$=0 1/min.

Figure 6:
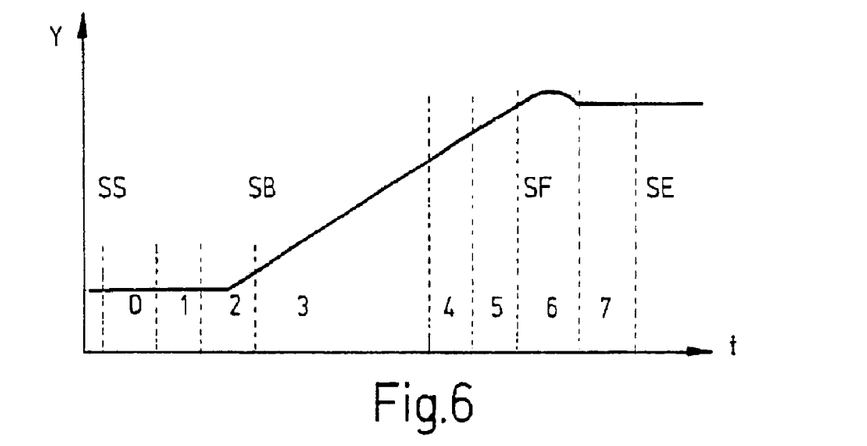
FIG. 6 is an example for the definition of phases for the operation of a downshift.

FIG. 6 shows an example of a possible phase definition for the operation of downshifting. A short description of the corresponding phases as well as the particular normal end criterion are given in the following Table II.

TABLE II

| Phase | Description | Normal End Criterion |
|---|---|---|
| 0 | Charging phase in which clutches are filled or released | as a rule, time criterion |
| 1 | Relaxation phase | Time criteria or event criteria of the pressure control |
| 2 | Wait for shift start | Movement out of synchronous rpm |
| 3 | Shift operation running | Specific distance from the synchronous rpm is attained (either estimated time criterion or turbine rpm criterion) |
| 4 | Shift operation running | Specific distance from the synchronous rpm is attained (either estimated time criterion or turbine rpm criterion) |
| 5 | Preparatory phase in advance of reaching the synchronous rpm | Synchronous rpm is reached |
| 6 | Phase for rpm overshoots | End of the phase for rpm overshoots, time criteria |
| 7 | Control after reaching the synchronous rpm | Shift operation is completed |

Figure 7:
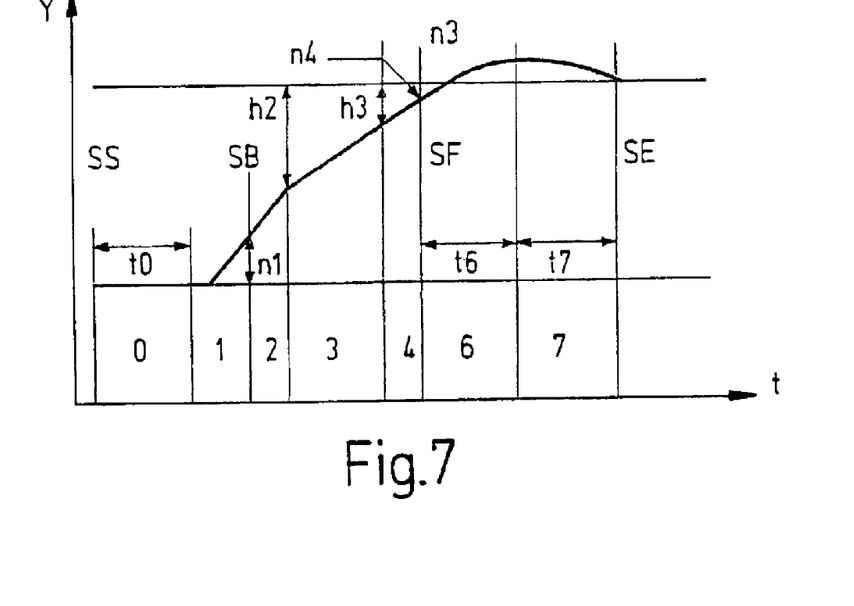
FIG. 7 shows an example of an rpm trace for a pull downshift operation wherein there is a shift from the fourth gear into the second gear with a phase definition according to FIG. 6.

FIG. 7 shows an example of the rpm trace for a pull downshifting operation (wherein there is a downshift from the fourth gear into the second gear) for a phase definition according to FIG. 6 or Table II.

In FIG. 7, the rpm thresholds are again characterized by $n_1$ and the time intervals are identified by $t_1$ and the ratios of the start rpm to the target rpm are identified by $h_1$. For the rpm trace, which is shown in FIG. 7, the following values apply: $t_0$=60 ms, $t_6$=100 ms, $t_7$=100 ms, $n_1$=25 1/min, $n_4$=20 1/min, $h_2$=70% and $h_3$=20%.

Figure 8:
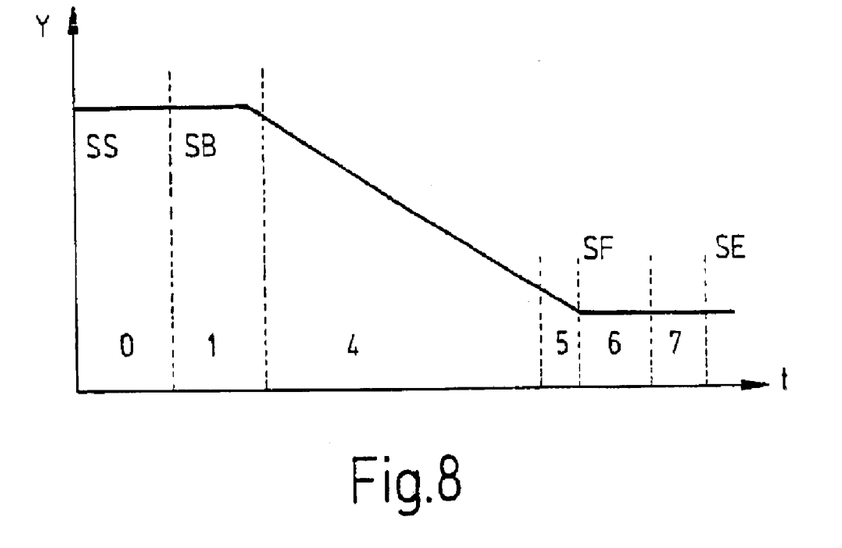
FIG. 8 is an example for the definition of phases for an intervention operation for a shifting from N to Dx or from N to R; and, FIG. 9 is a further example for the definition of phases for an intervention operation for a shift from R to D or from D to R.

FIG. 8 shows an example for the definition of phases for an intervention operation in a shifting from N (neutral) to $D_x$ (drive) or from N (neutral) to R (reverse).

Figure 9:
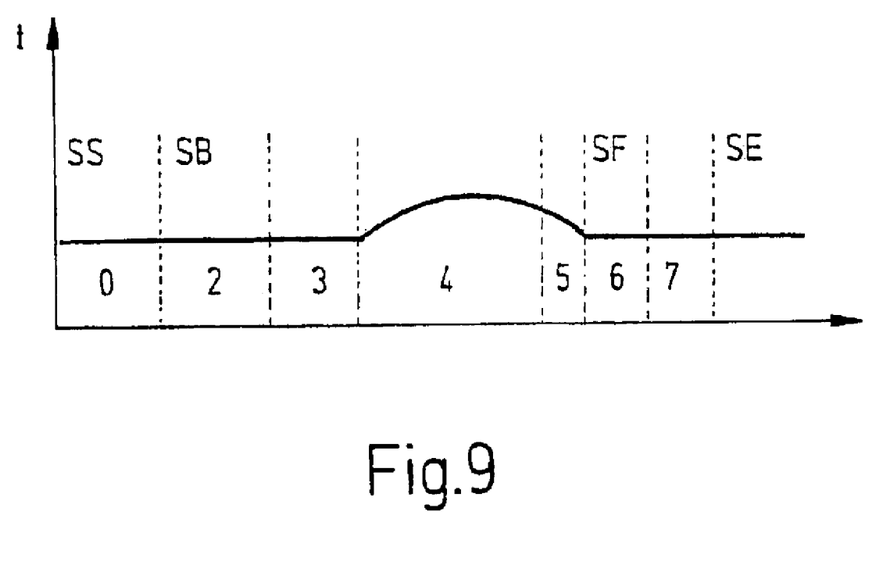

FIG. 9 shows a further example for the definition of phases for an intervention operation wherein there is a shifting from R (reverse) to D (drive) or from D (drive) to R (reverse).

The above description of the embodiments according to the present invention serves illustrative purposes only and not the purpose of limiting the invention. Within the context of the invention, various changes and modifications are possible, without departing from the scope of the invention or its equivalents.

What is claimed is:

1. A shift sequence control for coordinating shifting operations, the shift sequence control comprising:
   the shifting operations corresponding to changes of constellations in a transmission;
   a change of the constellations resulting in a change of the force transfer of the transmission and the sequence of the shifting taking place via a program control and being subdivided into phases (0, 1, 2, 3, 4, 5, 6, 7) with the sequence including the drive of a plurality of actuators and the phases each being assigned at least a type of drive for at least one actuator; and,
   the phases (0, 1, 2, 3, 4, 5, 6, 7) being configured without changing a program of the program control.

2. The shift sequence control of claim 1, wherein at least some of the phases (0, 1, 2, 3, 4, 5, 6, 7) are assigned criteria whose satisfaction leads to an end of the corresponding phase.

3. The shift sequence control of claim 1, wherein the criteria include time criteria.

4. The shift sequence control of claim 1, wherein the time criteria consider one or several of the following measured or estimated times: time up to reaching or leaving a synchronous rpm, time up to the start or end of a shift phase, time up to reaching or leaving a pregiven pressure.

5. The shift sequence control of claim 1, wherein the criteria include event criteria.

6. The shift sequence control of claim 1, wherein the event criteria take into account one or several of the following quantities and/or their time-dependent derivatives: engine rpm, transmission ratio, synchronous rpm(s), thrust forces, acceleration torques, accelerator pedal position, turbine rpm, output rpm.

7. The shift sequence control of claim 1, wherein actuating elements include pressure control valves and/or magnetic valves and/or step motors and/or internal combustion engine control means.

8. The shift sequence control of claim 1, wherein at least some of the phases and/or some of the criteria (0, 1, 2, 3, 4, 5, 6, 7) are assigned at least one sequence phase (0, 1, 2, 3, 4, 5, 6, 7), which is run through at the end of the phase (0, 1, 2, 3, 4, 5, 6, 7) or with the satisfaction of a criterion.

9. The shift sequence control of claim 1, wherein the configuration of the phases (0, 1, 2, 3, 4, 5, 6, 7) takes places via data which define the type of drive and/or the criteria and/or the sequence phases in the context of available functions and that the data can be adapted at least to different types of transmission and transmission manufacture series.

10. The shift sequence control of claim 1, wherein state quantities are detected and that a shift strategy is selected on the basis of these state quantities and that predetermined phases (0, 1, 2, 3, 4, 5, 6, 7) are assigned to the shift strategy.

11. The shift sequence control of claim 1, wherein the state quantities include the current gear and/or the target gear and/or the vehicle speed and/or the engine torque.

12. The shift sequence control of claim 1, wherein the shift strategy can be configured without changing the program.

13. The shift sequence control of claim 1, wherein the data define the allocations of phases (0, 1, 2, 3, 4, 5, 6, 7) to shift strategies.

14. The shift sequence control of claim 1, wherein at least one actuator element is an active actuator element, which can request the end of a phase (0, 1, 2, 3, 4, 5, 6, 7).

15. A method for coordinating shift sequences which correspond to changes of constellations in a transmission, the method comprising the steps of:
    changing the constellations to cause a change of the force transfer of the transmission;
    causing the sequence of the shifting to take place via a program control and subdividing the sequence into phases (0, 1, 2, 3, 4, 5, 6, 7), with the sequence including the control of a plurality of actuator elements;
    assigning at least one type of control to at least one actuating element; and,
    defining the phases (0, 1, 2, 3, 4, 5, 6, 7) by data which can be changed without changing a program of the program control.

16. The method of claim 15, wherein at least some of the phases (0, 1, 2, 3, 4, 5, 6, 7), via the data, are assigned criteria whose satisfaction leads to the end of the corresponding phase (0, 1, 2, 3, 4, 5, 6, 7).

17. The method of claim 15, wherein the criteria include time criteria.

18. The method of claim 15, wherein the time criteria consider one or several of the following measured or estimated times: time to reach or leave a synchronous rpm, time to the start or end of a shift phase, time to reach or leave a pregiven pressure.

19. The method of claim 15, wherein the criteria include event criteria.

20. The method of claim 15, wherein the event criteria consider one or several of the following quantities and/or their time-dependent derivatives: engine rpm, transmission ratio, synchronous rpm, thrust forces, acceleration torque, accelerator pedal position, turbine rpm, output rpm.

21. The method of claim 15, wherein the data include drive data for actuating elements which are formed by pressure controller valves and/or magnetic valves and/or step motors and/or internal combustion engine control means.

22. The method of claim 15, wherein at least to some of the phases (0, 1, 2, 3, 4, 5, 6, 7) and/or to some of the criteria, via the data, at least one sequence phase is assigned which is run through at the end of the phase (0, 1, 2, 3, 4, 5, 6, 7) or with the satisfaction of a criterion.

23. The method of claim 15, wherein the data can be adapted at least to different types of transmission and transmission manufacture series.

24. The method of claim 1, wherein the state quantities are detected and that, based on these state quantities, a shift strategy is selected to which predetermined phases are assigned.

25. The method of claim 15, wherein the state quantities include the current gear and/or the target gear and/or the vehicle speed and/or the engine torque.

26. The method of claim 15, wherein the shift strategies are configured via the data without change of the program.

27. The method of claim 15, wherein the data define the assignments of phases (0, 1, 2, 3, 4, 5, 6, 7) to shift strategies.

* * * * *

UNITED STATES PATENT AND TRADEMARK OFFICE
CERTIFICATE OF CORRECTION

PATENT NO. : 6,912,456 B2
DATED : June 28, 2005
INVENTOR(S) : Martin Eck, Tobias Ernst and Uwe Maienberg It is certified that error appears in the above-identified patent and that said Letters Patent is hereby corrected as shown below:

<u>Column 10,</u>
Line 22, delete "claim 1," and substitute -- claim 15, -- therefor.

Signed and Sealed this

Twenty-third Day of August, 2005

JON W. DUDAS
*Director of the United States Patent and Trademark Office*